US008560480B2

(12) United States Patent
Du et al.

(10) Patent No.: US 8,560,480 B2
(45) Date of Patent: Oct. 15, 2013

(54) TASK-BASED EXPERIENCE REUSE

(75) Inventors: Ying Du, Newtownabbey (GB); Bo Hu, Huntingdon (GB)

(73) Assignee: SAP AG, Walldorf (DE)

( * ) Notice: Subject to any disclaimer, the term of this patent is extended or adjusted under 35 U.S.C. 154(b) by 380 days.

(21) Appl. No.: 12/868,259

(22) Filed: Aug. 25, 2010

(65) Prior Publication Data

US 2012/0054142 A1 Mar. 1, 2012

(51) Int. Cl.
*G06F 17/00* (2006.01)
*G06N 5/02* (2006.01)
*G06Q 10/00* (2012.01)
*G06F 9/44* (2006.01)

(52) U.S. Cl.
USPC ........... 706/47; 705/7.12; 705/7.21; 705/301; 705/305; 717/102

(58) Field of Classification Search
USPC .................. 706/47; 705/7.12, 7.21, 301, 305; 717/102
See application file for complete search history.

(56) References Cited

U.S. PATENT DOCUMENTS

| | | | | |
|---|---|---|---|---|
| 5,717,835 | A * | 2/1998 | Hellerstein | 706/46 |
| 6,021,411 | A * | 2/2000 | Brophy et al. | 1/1 |
| 7,228,329 | B2 * | 6/2007 | Kaiser | 709/203 |
| 2007/0106520 | A1 * | 5/2007 | Akkiraju et al. | 705/1 |
| 2007/0162324 | A1 * | 7/2007 | Suzuki et al. | 705/9 |
| 2007/0250405 | A1 * | 10/2007 | Ronen et al. | 705/27 |
| 2008/0177622 | A1 * | 7/2008 | Akkiraju et al. | 705/10 |
| 2009/0037237 | A1 * | 2/2009 | Weber et al. | 705/7 |
| 2009/0113394 | A1 * | 4/2009 | Weber et al. | 717/126 |
| 2009/0150906 | A1 * | 6/2009 | Schmidt et al. | 719/317 |

OTHER PUBLICATIONS

Balogh, Z., et al. "Remark-Reusable Agent-Based Experience Management and Recommender Framework in ICCS'04/Agent Day 2004." Proc. of International Conference on Computational Science, Part III, LNCS. vol. 3038.*
Baxter, David, et al. "An engineering design knowledge reuse methodology using process modelling." Research in engineering design 18.1 (2007): 37-48.*
Bergmann, Ralph, et al. Developing industrial case-based reasoning applications: The INRECA methodology. vol. 1612. Springer, 2004: 35-70.*
Chan, Christine W., Lin-Li Chen, and Liqiang Geng. "Knowledge engineering for an intelligent case-based system for help desk operations." Expert systems with applications 18.2 (2000): 125-132.*

(Continued)

*Primary Examiner* — Jeffrey A. Gaffin
*Assistant Examiner* — James F Sugent
(74) *Attorney, Agent, or Firm* — Fish & Richardson P.C.

(57) ABSTRACT

Implementations of the present disclosure include receiving a task including structured data and unstructured data, processing the task to generate a current task object, the current task object comprising a plurality of task attributes, retrieving a previous task object, for each task attribute of the plurality of task attributes, calculating a task attribute similarity value based on a corresponding task attribute of the previous task object, determining whether a rule is applicable to a task similarity calculation, weighting each of the plurality of task attribute similarity values using a plurality of weight values, wherein a first weight value applied to a first task similarity value is different than a second weight value applied to a second task similarity calculation when determining that the rule is applicable to the task similarity calculation, calculating a task similarity value, and providing the task similarity value to be displayed on a display.

19 Claims, 6 Drawing Sheets

(56) References Cited

OTHER PUBLICATIONS

Althoff, Klaus-Dieter, Ralph Bergmann, and L. Karl Branting, eds. Case-Based Reasoning Research and Development: Third International Conference on Case-Based Reasoning, ICCBR-99, Seeon Monastery, Germany, Jul. 27-30, 1999, Proceedings. vol. 1650. Springer, 1999: 132-146.*
Hu, Bo, et al. "Semantic metrics." Managing Knowledge in a World of Networks (2006): 166-181.*
Hu, Bo, and Bin Hu. "On capturing semantics in ontology mapping." World Wide Web 11.3 (2008): 361-385.*
Huang et al., "Rough set approach to case-based reasoning application." Expert Systems with Applications 26 (2004): 369-385.*
Lewis, Lundy. "A case-based reasoning approach to the management of faults in communication networks." INFOCOM'93. Proceedings. Twelfth Annual Joint Conference of the IEEE Computer and Communications Societies. Networking: Foundation for the Future, IEEE. IEEE, 1993.*
Madhusudan, Therani, J. Leon Zhao, and Byron Marshall. "A case-based reasoning framework for workflow model management." Data & Knowledge Engineering 50.1 (2004): 87-115.*
Witschel, Hans Friedrich, et al. "Model of organizational requirements and of supporting services of the OLME." (2009).*
Ong, Ernie, et al. "Semantic Task Management Framework: Bridging Information and Work." Networked Knowledge-Networked Media (2009): 25-43.*
Ong, Ernie, et al. "Semantic task management framework." Proc. I-KNOW. vol. 8. 2008.*
Roth-Berghofer, Thomas. "Learning from HOMER, a case-based help desk support system." Advances in Learning Software Organizations (2004): 88-97.*
Tseng, Hwai-En, Chien-Chen Chang, and Shu-Hsuan Chang. "Applying case-based reasoning for product configuration in mass customization environments." Expert Systems with Applications 29.4 (2005): 913-925.*
Kang, Yong-Bin, et al. "A computer-facilitated method for matching incident cases using semantic similarity measurement." Integrated Network Management-Workshops, 2009. IM'09. IFIP/IEEE International Symposium on. IEEE, 2009.*
Ying Du et al., "Facilitating Experience Reuse: Towards a Task-based Approach," The 4th International Conference on Knowledge Science, Engineering & Management (KSEM 2010), Sep. 1-3, 2010, pp. 494-505, Belfast, Northern Ireland, UK.
Bergmann, R., "Experience Management: Foundations, Development Methodology, and Internet-Based Applications," Lecture Notes in Artificial Intelligence (LNAI), vol. 2432, Springer, 2002, pp. 1-393.
Z Sun et al., "Experience Management in Knowledge Management," In Khosla, R, Howlett, RJ and Jain LC (eds), Proceedings of the Knowledge-Based Intelligent Information and Engineering Systems, 9th International Conference (KES2005), Melbourne, Australia, Sep. 14-16, 2005, I, 979-986.
K. Wiig, "People-Focused Knowledge Management," Elsevier, Burlington, MA, May 2004.
U.V. Riss et al., "Task Journals as Means to Describe Temporal Task Aspect for Reuse in Task Patterns," Proceedings of the 9th European Conference on Knowledge Management, Southampton, UK, Sep. 2008, pp. 721-729.
Y. Du et al. "Work Experience Reuse in Pattern Based Task Management," Proceedings of the 9th International Conference on Knowledge Management (I-KNOW'09), Sep. 2-4, 2009. Graz, Austria, pp. 149-158.
Nepomuk, "Task Management Model: Deliverable D3.1," http://nepomuk.semanticdesktop.org/xwiki/bin/view/Main1/D3-1, Jan. 29, 2007, 91 pages.
A. Tversky, "Features of Similarity," Psychological Review, vol. 84, No. 4, pp. 327-352, Jul. 1977.
A. Tversky et al., "Studies of Similarity," Rosch, E., Lloyd, B. (eds.): Cognition and Categorization, pp. 79-98, Hillsdale, NJ, 1978.
J. Schulz, "Jaccard Similarity," May 15, 2008, 5 pages, retrieved from www.code10.info/index.php?option=com_content&view=article&id=60:articlejaccard-similarity&catid=38:cat_coding_algorithms_data-similarity&Itemid=57.
T. Winograd, "Architectures for Context," Human-Computer Interaction, vol. 16, pp. 401-419, 2001.
H. Huang et al., "Using Activity Theory to Identify Relevant Context Parameters," In Garther, G., Rehrl, K. (eds.), Location Based Services and TeleCartography II, LNGC, pp. 35-35, Springer, Heidelberg, 2009.
V. Basili et al., "The Experience Factory," Encyclopedia of Software Engineering, Feb. 1994, vol. 2, pp. 469-476.
K.D. Althoff et al., "Experience Management: The Fraunhofer IESE Experience Factory," Proceedings of Industrial Data Mining Conference, Leipzig, Germany, Jul. 24-25, 2001, 17 pages.
U. Riss et al., "Challenges for Business Process and Task Management," Journal of Universal Knowledge Management, vol. 0, No. 2, Nov. 2005, pp. 77-100.
P. Moody et al., "Business activity patterns: A new model for collaborative business applications," IBM System Journal, vol. 45, No. 4, pp. 683-694, 2006.
Holz, H. et al., "Task-Based Process Know-how Reuse and Proactive Information Delivery in TaskNavigator," Proceedings of the 15th ACM International Conference on Information and Knowledge Management, CIKM'06, Nov. 5-11, 2006, pp. 522-531.
BrainBot Technologies, "Brain Filer," http://brainbot.com/site3/produkte/brainfiler [retrieved on Apr. 26, 2012], 2010, 2 pages.
R. Shkundina, "A Similarity Measure for Task Contexts." 6th International Conference on Case-Based Reasoning, ICCBR 2005, Workshop Proceedings: Similarities—Processes—Workflows, Chicago, IL, Aug. 23-26, 2005, pp. 261-270.
L. Sauermann, "Personalization in the EPOS project.," 3rd European Semantic Web Conference, Semantic Web Personalization Workshop, Jun. 12, 2006, Budva, Montenegro, 11 pages.

* cited by examiner

TASK-BASED EXPERIENCE REUSE

BACKGROUND

Experience can be described as the specific knowledge resided in a problem solving process and context, and can be acquired through repeatedly performing work activities and executing daily tasks within a domain. Organizations can benefit from work experience reuse in terms of improved productivity and cost reduction. Work experience is incrementally gained from the execution of tasks, and successful task execution may rely on the possession of relevant work experience. Work experience reuse, however, is becoming a technological challenge in the emerging knowledge society.

SUMMARY

Implementations of the present disclosure include methods of determining a similarity between tasks. In some implementations, a method includes receiving a task, at a computing device, the task comprising structured data and unstructured data, processing the task to generate a current task object based on the structured data and the unstructured data, the current task object comprising a plurality of task attributes, retrieving a previous task object from a computer-readable repository, for each task attribute of the plurality of task attributes, calculating a task attribute similarity value based on a corresponding task attribute of the previous task object, thereby providing a plurality of task attribute similarity values, determining whether a rule is applicable to a task similarity calculation, weighting each of the plurality of task attribute similarity values using a plurality of weight values to provide a plurality of weighted task attribute similarity values, wherein a first weight value applied to a first task similarity value is different than a second weight value applied to a second task similarity calculation when determining that the rule is applicable to the task similarity calculation, calculating a task similarity value between the current task object and the previous task object based on the weighted task attribute values, and providing the task similarity value to be displayed on a display.

In some implementations, determining whether the rule is applicable to a task similarity calculation includes retrieving the rule from a rule repository, and determining whether the rule is applicable to the task similarity calculation based on one or more of the plurality of task attributes of the current task object. In some implementations, determining whether the rule is applicable to the task similarity calculation is further based on one or more task attributes of the previous task objects.

In some implementations, each of the weight values is determined based on a number of task attributes in the plurality of task attributes and a parameter. In some implementations, the parameter varies between two or more of the weight values when determining that the rule is applicable to the task similarity calculation. In some implementations, the rule defines a value of the parameter for each of the weight values.

In some implementations, the rule includes compulsory context information (CCI) and optional context information (OCI), and each of the weight values is determined based on a total number of previous task objects that meet the CCI and task-ranking values based on the OCI.

In some implementations, application of the rule results in the task similarity value indicating an absolute similarity between the current task object and the previous task object. In some implementations, the task similarity value is equal to one.

In some implementations, application of the rule results in the task similarity value indicating an absolute dissimilarity between the current task object and the previous task object. In some implementations, the task similarity value is equal to zero.

In some implementations, processing the task to generate a current task object includes mapping each data of the structured data to a corresponding task attribute, extracting one or more terms from the unstructured data, and mapping each of the one or more terms to a corresponding task attribute. In some implementations, extracting one or more terms from the unstructured data includes comparing terms of the unstructured data to pre-defined terms that are stored in computer-readable memory, wherein a term is extracted when the term matches a pre-defined term. In some implementations, the pre-defined terms are domain-specific terms that are manually entered into the computer-readable memory.

In some implementations, the method further includes calculating a plurality of task similarity values between the current task object and each of a plurality of previous task objects, the task similarity value being included in the plurality of task similarity values, and providing one or more of the plurality of task similarity to be displayed on the display.

In some implementations, the method further includes identifying information corresponding to a resolution of the previous task, and providing the information to be displayed on the display.

In some implementations, the first weight value applied to the first task similarity value is equal to the second weight value applied to the second task similarity value when determining that the rule is inapplicable to the task similarity calculation.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. In some implementations, the system includes a display, one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to systems and methods for capturing work experience and providing knowledge structures to enable reuse of the work experience. Work experience can be captured in a task ontology that includes the entities involved in the task execution, such as documents, emails, and people. The relationships between these entities and the task are explicitly represented by the properties of the task ontology, which provides rich knowledge structures for describing how a piece of work is organized, structured and accomplished. Work experience is formally represented as task instances, which can be retrieved, shared, and reused by subsequent users having similar tasks at hand.

Figure 1:
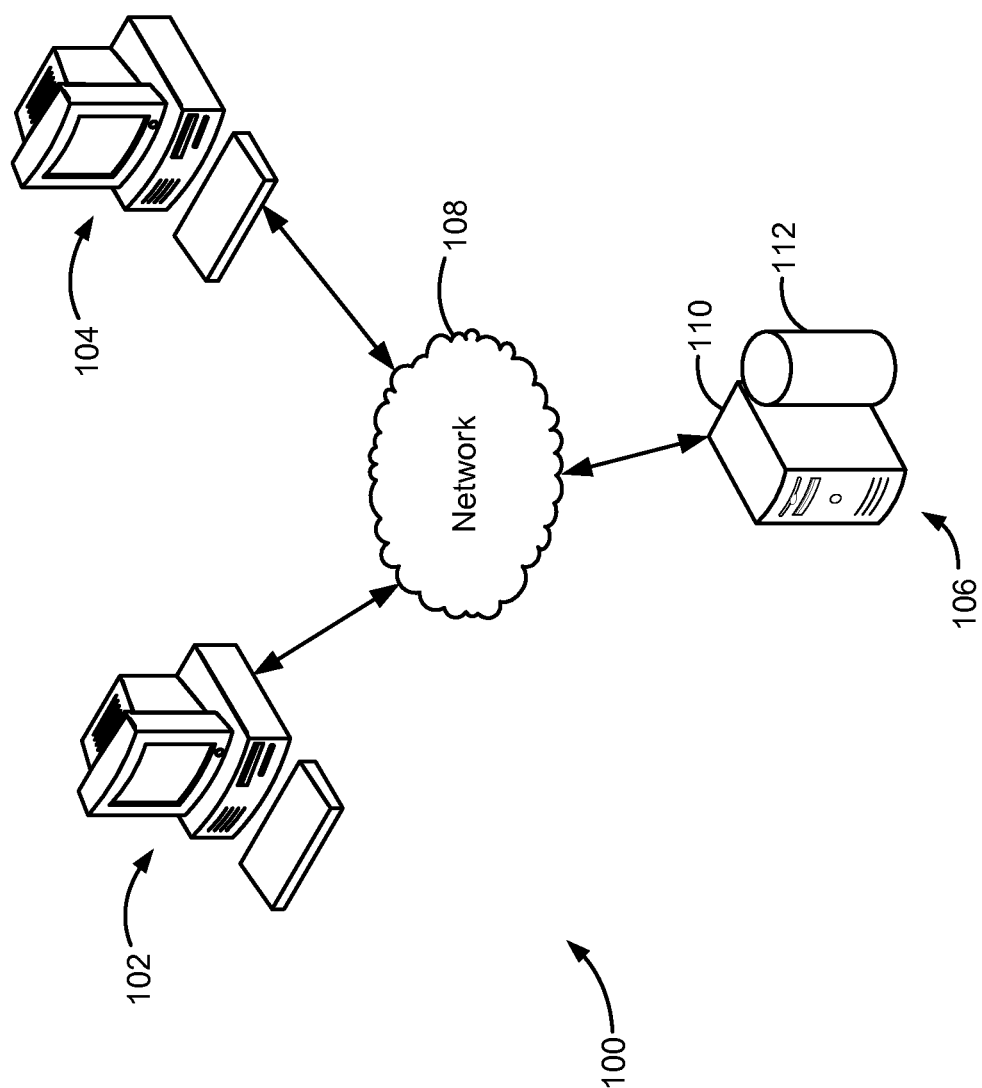
FIG. 1 depicts an example system architecture that can execute implementations of the present disclosure.

FIG. 1 depicts an example system 100 that can execute implementations of the present disclosure. The system 100 includes a computing device 102, a computing device 104, a server system 106 and a network 108. The computing devices 102, 104 and the server system 106 can communicate with one another over the network. The computing devices 102, 104 can include any type of computing device, such as a desktop computing device, a laptop computing device, a handheld computing device (e.g., a personal digital assistant (PDA)), and/or a smartphone. The server system 106 includes a computing device 110 and a computer-readable and -writable memory 112. The computing device 110 can perform operations in accordance with implementations of the present disclosure, and the computer-readable and -writable memory 112 can store information, as discussed in further detail herein. The network 108 can be provided as a large computer network, such as a local area network (LAN), wide area network (WAN), the Internet, a cellular network, or a combination thereof connecting any number of computing devices and server systems.

For purposes of illustration, implementations of the present disclosure will be described with reference to an example domain. It is appreciated, however, that implementations of the present disclosure are equally applicable to other domains. The example domain includes technical support provided by a Technical Support Team (TST). The TST is responsible for providing technical support to customers around the globe, and operates under a customer support process that is managed using an information technology (IT) Ticket Management System (TMS). An example TST includes the Business ByDesign (ByD) TST provided by SAP AG of Waldorf, Germany. In this example domain, a customer can submit a ticket to describe problems occurring in the ByD system, for example. The ticket is allocated to a technical support technician. Based on the ticket description, the technician analyzes the problem, identifies useful information resources that can resolve the ticket, and communicates with other colleagues who may have already dealt with a similar problem.

Referring again to FIG. 1, the computing device 102 can be associated with a customer and the computing device 104 and the server system 106 can be associated with the TST. For example, a customer can submit a ticket to the TST using the computing device 102, which ticket is transmitted over the network 108 for reception by the TST (e.g., at the computing device 104 and/or the server system 106). The ticket can be assigned to a particular technical support technician that uses the computing device 104 to assist the customer and resolve the ticket, for example.

Figure 2:
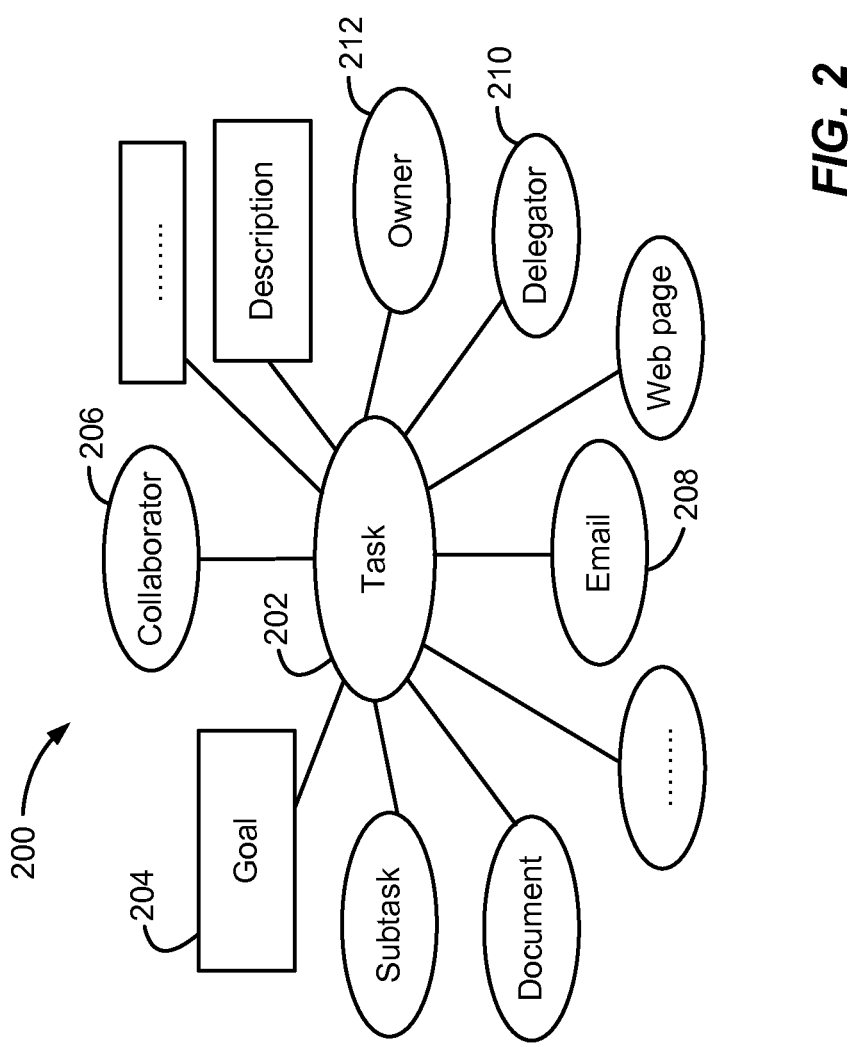
FIG. 2 depicts an example conceptual task model.

FIG. 2 depicts an example conceptual task model 200. A task 202 can be viewed as a number of activities associated with a particular goal 204. An activity can involve a number of entities that can include any object involved in task execution. Example entities can include a task participator, a digital document, and/or any physical resource. The task model 200 captures the involved entities, the relations among these entities, and the relations between entities and tasks. For example, a "Collaborator" entity 206 describes the collaborators who participate in task execution, and an "Email" entity 208 records email communications between collaborators. A "Delegator" entity 210 describes the person assigning the task, and an "Owner" entity 212 describes the person assigned to ensure completion of the task. All entities involved in the task execution can be formally conceptualized in a Task Model Ontology (TMO), discussed in further detail herein.

Entities captured in the task model describe how a task is performed. The task model concretizes the work experience, but is itself not an entire reflection of work experience. This is because work experience is not easily captured completely. However, in order to successfully accomplish a task, the task executor (e.g., a person) should know how to apply the associated resources and how to solve the problems appearing in the task. The task model (e.g., task model 200 of FIG. 2) approximates the work experience that is accumulated from the task execution. Consequently, the task model can be regarded as a carrier of work experience.

Referring again to the example domain provided above, and from a technical support technician's perspective, IT tickets can be considered as tasks to be performed and a ticket can be represented in the TMO (e.g., as a Task entity 202 of FIG. 2). For example, a customer is the task Delegator (e.g., Delegator entity 210 of FIG. 2), a technician who is responsible for a ticket is the task Owner (e.g., Owner entity 212 of FIG. 2), and colleagues participating in solving the ticket are the task Collaborators (e.g., Collaborator entities 206 of FIG. 2). In this case, collaborators are recorded with metadata and technician expertise is/are categorized by tasks. By making use of the semantics captured in the task ontology, it is possible to identify the 'right' colleagues with the 'right' expertise for the 'right' problem, thus improving collaborations. In addition to work collaboration, information support is another aspect that can be addressed by the task model. Documents, emails, and other useful information resources can be structured in a task-centric way. In this manner, a new mechanism for document retrieving, namely to discover similar documents according to the similarity of tasks, is provided.

Figure 3:
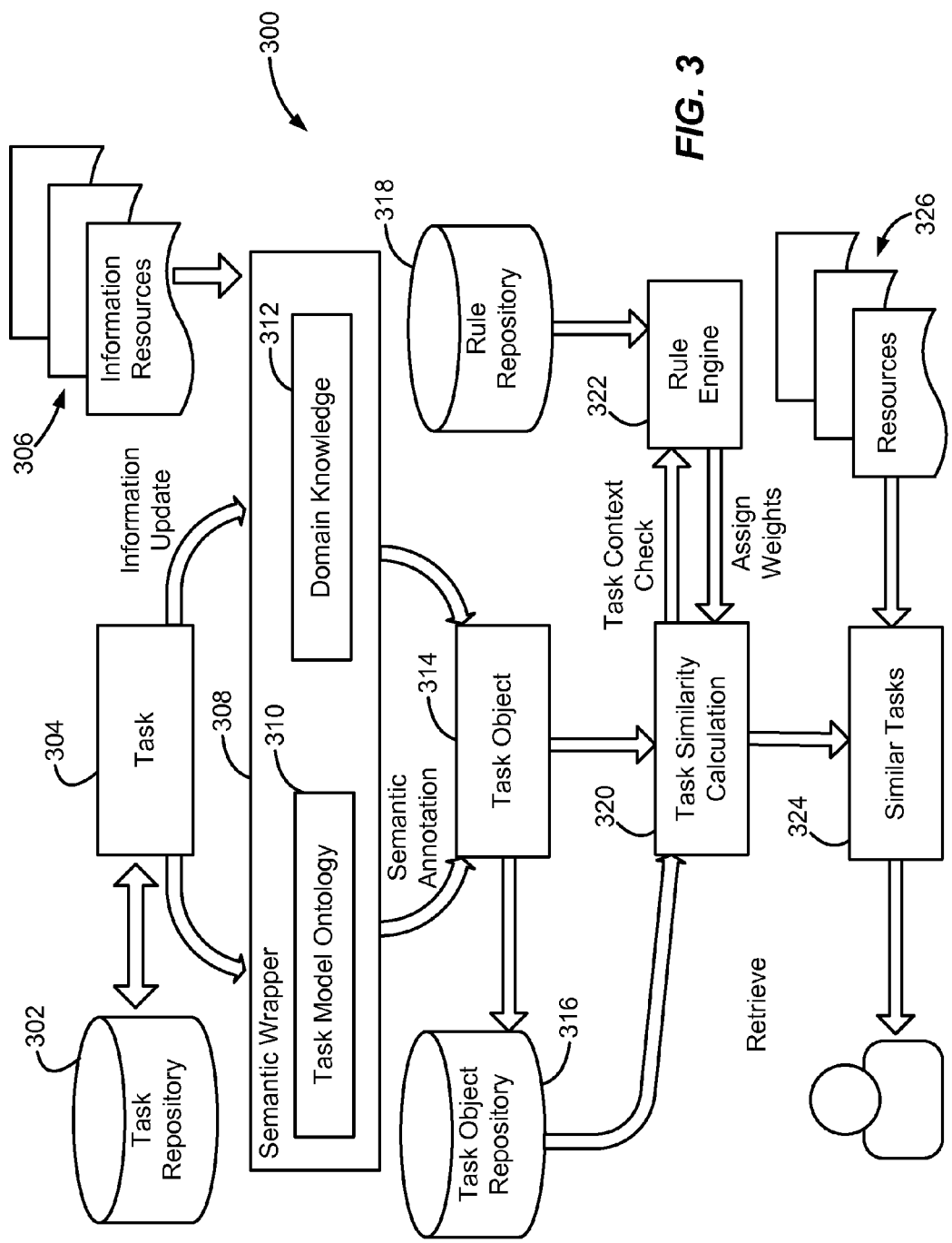
FIG. 3 depicts an example system architecture for task-based experience reuse in an example domain.

FIG. 3 depicts an example system architecture 300 for task-based experience reuse in an example domain. Although the system architecture 300 reflects the example domain provided above, this is for illustration purposes only. Specifically, the same or similar system architecture can be implemented for task-based experience reuse in any domain. The system architecture 300 includes a task repository 302, task 304 and information resources 306. The task 304 can include an unstructured or semi-structured task. The task repository 302 can be provided as a database that is stored in computer-readable memory (e.g., the computer-readable and -writable memory 112 of FIG. 1), and the task 304 can be a digital file that is generated in response to user input (e.g., a customer (owner) submitting an IT ticket). The information resources 306 can include information about customers, the technical support team, or any other information used to describe the entities involved in the task execution.

The system architecture 300 further includes a semantic wrapper component 308 that constructs a TMO 310 based on the task 304 and provided information (e.g., included as metadata with the task 304 and/or from the information resources 306) in view of domain knowledge terms identified using the domain knowledge component 312. The semantic wrapper component 308 can be provided as computer software and/or hardware that performs functions as discussed herein. The domain knowledge component 312 can be provided as a database or any storage component that contains a number of domain-specific terms that are manually defined and input by domain experts. These domain terms can be added to the task object as the value of a task attribute that will contribute to the task similarity computation. The system architecture 300 enables a semantic annotation process using the semantic wrapper component 308, in which a task (e.g., a ticket) is automatically annotated with metadata and an annotated task object 314 is generated. As discussed further below, the system architecture 300 also enables an experience reuse process based on recommending similar tasks to technicians.

The system architecture 300 also includes a task object repository 316, a rule repository 318, a task similarity calculation module 320, a rule-based engine module 322, a similar tasks module 324 and resources 326. The task object repository 316 and the rule repository 318 can each be provided as a database that is stored in computer-readable memory (e.g., the computer-readable and -writable memory 112 of FIG. 1). The task repository 316 stores the generated task object 314, as well as one or more previously generated task objects. The rule repository 318 stores rules that can be subsequently retrieved and applied in similarity calculations, as discussed in further detail below.

The semantic wrapper component 308 performs the semantic annotation process to integrate tickets with other useful information resources (e.g., customer information and system information), adds semantic metadata, and transfers the semantically enriched information items into a task object. A task (e.g., IT ticket) includes structured data and unstructured data. Structured data includes information about the delegator (e.g., the customer that creates the IT ticket), involved technicians, timestamps and other structured information items. Unstructured data includes problems described by the delegator, and solutions discussed and provided by technicians (e.g., collaborators). The semantic wrapper component 308 wraps both the structured and unstructured data into a task instance generated from the TMO.

The TMO is an upper-level task ontology that captures general aspects of a task, such as task attributes like delegator, owner, collaborator and status. The structured data of tickets can be directly reused to generate task instances. For example, the customer who creates the IT ticket is described as the task delegator in the task ontology (e.g., Delegator entity 210 of FIG. 2). The TMO treats a customer as an object rather than a piece of information, and uses a class (e.g., person) to model and represent customer information by a number of attributes (e.g., hasLocation, hasContactNumber, hasPersonalProfile).

As a general task ontology, the TMO is not able to capture the characteristics of a particular domain. Consequently, the concept of domainTerm is introduced as a new task attribute to capture relevant domain knowledge. Here, domainTerm refers to domain-specific terms that are commonly understood in a particular application domain. For example, the acronym CRM refers to Customer Relationship Management in an example technical support community. Domain terms can express background information and the domain-specific characteristics of a task, are embedded in ticket descriptions and have to be explicitly described in task instances. Consequently, the domain knowledge component 312 is implemented to filter out domain terms. For example, if the acronym CRM is described in a task description and has been recorded in the domain knowledge component 312, CRM is automatically added as a domain knowledge term to the corresponding task in the semantic annotation process.

The generated task object 314 is stored to the task repository 316 and is provided to the task similarity calculation component 320. As discussed in further detail herein, the task similarity calculation component 320 is implemented to identify which experiences are relevant to the current task at hand, which is represented in a task instance. The similar tasks module 324 presents one or more similar tasks to a user (e.g., technical support technician), as well as the solution(s) implemented to successfully resolve each of the one or more similar tasks. By knowing the task similarities, the user can leverage resources 326, associated with these similar tasks, to execute the new task. The resources 326 refers to any digital or physical resources associated to a task object. By way of one non-limiting example, an internal wiki page can be a resource that provides information relevant to completing a task and/or solving a particular technical problem described in a task. In such a case, the wiki page is a digital resource of the task, which relation is described by the TMO.

When the solution is provided, relevant work experiences are captured in the task instance. Consequently, the task instance becomes a carrier of work experience, and experience reuse can be achieved by comparing task similarities. This process is triggered when a user (e.g., technical support technician) searches for tasks that are similar to a particular task at hand. The search results can be provided as a list of similar tasks with different rankings. The similarity ranking between two tasks may change over time. For example, if a task is updated with new information, the similarity calculation will be affected.

In the similarity calculation process, the similarity of task attributes and human defined rules impact the similarity calculation. A similarity between task attributes can be calculated based on string comparison. For example, if two tasks are given the same task goal, the two tasks should have similarities. Human defined rules are provided and include a representation of human knowledge in other task owners (e.g., technical support technicians) can describe their expertise and work experience into rules that affect the task similarity calculation. These human generated rules are stored in the rule repository 318. Rules are checked by the rule-based engine 322, when two tasks are compared. If the compared tasks meet the conditions defined in rules, the rule-based engine interacts with the task similarity calculation component 320 to affect the similarity calculation. This is achieved using dynamic weighted task similarity algorithms discussed in further detail below.

Task similarity is related to the dynamically evolving context of the tasks as technicians incrementally add new information into tickets. As such, the similarity measure between two tasks is calculated based on a common feature comparison that is adjusted by the influence of changing context. For example, task $T_a$ and task $T_b$ denote two tasks, and $\omega_{Attk}$ denotes weights for feature k. A global similarity (Sim($T_a$, $T_b$)) for task $T_a$ and $T_b$ is calculated using the following equation:

$$Sim(T_a, T_b) = \sum_{i=1}^{n} \omega_{Attk} \cdot Sim_{Attk}(T_a, T_b) \qquad (1)$$

The value of Sim(Ta, Tb) is between 0 and 1. A value of 0 indicates that $T_a$ is not similar to $T_b$. Any value that is greater than 0 indicates a degree of similarity between $T_a$ and $T_b$. The greater the value is, the more similar the two tasks are.

The similarity function $Sim_{Attk}(T_a, T_b)$ computes the similarity of each task attribute (from Att1 to Attk). The variable n is the number of compared task attributes. In the computation process, a statistic is used for comparing the similarity and diversity of sample sets. Such a statistic includes the Jaccard similarity coefficient, which can be used to calculate the string similarity of task attributes. For example, if the task name (i.e., Attk=Name) of $T_a$ and $T_b$ is literally equivalent, the similarity value $Sim_{Name}(T_a, T_b)$ equals 1. On the other hand, the similarity value $Sim_{Name}(T_a, T_b)$ equals 0 when no common words are shared in the name attribute.

$Sim_{Att1}(T_a, T_b)$, $Sim_{Att2}(T_a, T_b)$, ..., $Sim_{Attk}(T_a, T_b)$ return a number of task attribute similarity values, each ranging between 0 and 1. Depending on user defined rules, the similarity of individual attributes are assigned with respective weights: $\omega_{Att1}, \omega_{Att2}, \ldots, \omega_{Attk}$. This accounts for the fact that different task attributes have different importance during similarity calculation. The weight is changing over time, and is therefore considered to be dynamic. Weights change, for example, when new rules are considered or task attributes are assigned with different weight values. $\omega_{Attk}$ can be calculated using the following equation:

$$\omega_{Attk} = \frac{\frac{1}{n} + \gamma_k}{\sum_{i=1}^{n} \frac{1}{n} + \gamma_k} \qquad (2)$$

In Equation 2, n is the number of compared task attributes, and $\gamma_k$ is a parameter defined in the user defined rules that is used to adjust task similarities based on human knowledge. If no user defined rules can be applied to the similarity computation process, $\gamma_k$ is equal to 0. According to the equation 2, $\omega_{Att1} = \ldots = \omega_{Attk} = 1/n$. In such a case, all attributes share equivalent importance.

A task similarity rule (TSR) is used to formally model and represent domain knowledge for task similarity calculation. Technicians can specify their own views on task similarity in a TSR, thus improving the similarity calculation result based on their domain expertise. This is achieved by defining a number of conditions in a TSR. Each condition represents a task context that includes a task attribute with a predefined value. Features of a task become task context through their use in similarity computation. Features are modeled by the task attributes in the TMO. Consequently, a task context can be defined as the task attributes involved in the task similarity computation and their pre-defined values provided in the TSR. An example TSR can be provided as:

IF $T_{a\text{-}delegator} = T_{b\text{-}delegator}$ AND $T_{a\text{-}domainTerm} \supseteq \{\text{'v1.2'},\text{'CRM'}\}$ AND $T_{b\text{-}domainTerm} \supseteq \{\text{'v3.1'},\text{'CRM'}\}$

THEN $\gamma_1 = \gamma_2 = \ldots = \gamma_k = -1/n$

In the example TSR above, the task attributes delegator and domainTerm are associated with particular values, denoting the task context information in the TSR. The example TSR states that $T_a$ and $T_b$ are not similar in such task contexts, and expresses the domain knowledge that the system problems about CRM are different in system version v1.2 and system version v3.1. Consequently, values of $\gamma_1 = \gamma_2 = \ldots = \gamma_k$ are set equal to $-1/n$. In accordance with Equation 2, above, $\omega_{Att1} = \omega_{Att2} = \ldots = \omega_{Attk} = 0$. Consequently, $Sim(T_a, T_b)$ is equal to 0, which indicates an absolute dissimilarity between task $T_a$ and task $T_b$. Had the human knowledge presented in the TSR above not been considered, $T_{a \text{ and } Tb}$ would be treated as similar tasks, because they have common attribute values, for example, and share the same delegator and domainTerm.

In addition to determining dissimilarity between tasks, a TSR can define that two tasks are absolutely similar to each other, in which the $Sim(T_a, T_b)$ must be equal to 1. In this case, task similarity is solely dependant on the TSR. For example, a technician has the knowledge that $T_a$ and $T_b$ must be similar tasks, if $T_a$ and $T_b$ are from the same delegator and their domain terms include 'v1.2', 'CRM', and 'XH error'. To capture this human knowledge, the value of $\gamma_k$ can be defined such that $Sim(T_a, T_b)$ equals 1, which indicates an absolute similarity between task $T_a$ and task $T_b$. An example TSR that defines the absolute similarity between two tasks can be provided as:

IF $T_{a\text{-}delegator} = T_{b\text{-}delegator}$ AND $T_{a\text{-}domainTerm} \cap T_{b\text{-}domainTerm} \supseteq \{\text{'v 1.2'},\text{'CRM'},\text{'XH error'}\}$

THEN $$\gamma_k = \frac{1 - Sim_{Attk}(T_a, T_b)}{n \cdot Sim_{Attk}(T_a, T_b) - 1}$$

The above example TSRs demonstrate leveraging of a technician's domain knowledge to determine the dissimilarity and the absolute similarity between tasks. However, in some situations, domain knowledge is not sufficient to support such determination. For example, a technician has the domain knowledge that the tasks associated with domainTerm 'v1.2' and 'CRM' should have similarity, and especially the tasks delegated from the same customer are more similar. In this case, the attribute delegator has great impact on task similarity. Consequently, the weight value of delegator ($\omega_{delegator}$) (e.g., determined based on Equation 2) should be increased by assigning a value to the corresponding $\gamma_{delegator}$. Moreover, in this example, the technician has the knowledge that the task similarity is also affected by the task's creation date (e.g., the closer their creation dates are to one another, the more similar two tasks are). According to this example domain knowledge, a TSR can be generated as:

IF

CCI: [$T_{a\text{-}delegator} = T_{b\text{-}delegator}$ AND $T_{a\text{-}domainTerm} \cap T_{b\text{-}domainTerm} \supseteq \{\text{'v 1.2'},\text{'CRM'}\}$]

OCI: [$T_{a\text{-}timeStamp}, T_{b\text{-}timeStamp}$) → Closer; Similarity→ Increase]

THEN $$\gamma_{Delegator} = \frac{\theta}{\varphi}$$

This example TSR includes three task context items. For example, $T_{a \cdot delegator} = T_{b \cdot delegator}$ is a task context item, which can be identified as TC1. Another task context item, which can be identified as TC2, defines that the task attribute domainTerm must have the value of 'v 1.2' and 'CRM'. Another task context item, which can be identified as TC3, describes that timeStamp is the attribute that can increase task similarities. The value φ is the total number of the tasks that meet all the CCI, and the value θ is the task-ranking value based on the OCI.

The task context items play different roles and have different importance in the task similarity computation. For example, TC1 and TC2 are the task context items that must be fulfilled for the TSR to be applicable to the similarity computation. Accordingly, these task context items are deemed to include compulsory context information (CCI). TC3 is the task context item that is optional, and can be referred to as optional context information (OCI).

The CCI is the task context required to ensure a TSR is applicable in a particular similarity computation. In the above TSR examples, the task context information delegator and domainTerm, and their associated values, are CCI. Task similarity is determined by the string comparison of task attributes when CCIs are not fulfilled. In this case, all task attributes share the same importance during similarity measure, which means their weights ($\omega_{Attk}$) are equal to 1/n and the value of $\gamma_k$ is equal to 0.

In contrast to the CCI, the OCI will not affect the applicability of a TSR. The role of the OCI is to improve the accuracy of a particular similarity measure. Based on the task context defined in an OCI, the similarity will be further adjusted (e.g., increased or decreased) by changing the value of $\gamma_k$. In the example TSR above, an OCI is provided as the Ta timeStamp and the Tb timeStamp are closer, the similarity is increased.

The following example illustrates the calculation of the values of θ and φ to determine $\gamma_{delegator}$. Suppose that tasks $T_c$, $T_d$ and $T_e$, all meet the CCI defined in the example TSR above, and that they are similar tasks to task $T_a$. Their respective similarities to $T_a$ are calculated by the function $Sim(T_a, T_c)$, $Sim(T_a, T_d)$ and $Sim(T_a, T_e)$. The OCI is used for further adjusting the similarity value of each function. In the given tasks, the creation data of $T_e$ (i.e., $T_{e \cdot timeStamp}$) the closest one to $T_a$, followed by $T_c$ and then $T_d$. In this example, $T_c$, $T_d$ and $T_e$ each meet all of the CCI. Consequently, φ=3. The highest ranked task (e.g., $T_e$) is assigned to the value of φ. That is θ=φ for the highest ranked task. The value of θ for the second highest ranked task ($T_c$) is assigned the value of φ−1 (i.e., θ=φ−1=2), and value of θ for the third highest ranked task ($T_d$) is assigned the value of φ−2 (i.e., θ=φ−2=1). The highest ranked task is deemed to be $T_e$, because the creation date of $T_e$ is closest to that of $T_a$. Therefore, in the function $Sim(T_a, T_e)$, $\gamma_{delegator}$ is set equal to 3/3, or 1. In the function $Sim(T_a, T_c)$, $\gamma_{delegator}$ is set equal to (3−1)/3, or 2/3, and in the function $Sim(T_a, T_d)$, $\gamma_{delegator}$ is set equal to (3−2)/3, or 1/3. In the above example, the different values of $\gamma_{delegator}$ are adjusted based on the context defined in the OCI.

As discussed above, a task (e.g., an IT ticket) includes both structured and unstructured data. The structured data, such as name, creation date-time, delegator, and owner are directly transferred to a task instance. For example, the task name is represented by the task attribute name in a task instance, and the delegator name (e.g., customer) is mapped to the task attribute delegator. The unstructured data is included in task descriptions (e.g., descriptions input by the delegator). The domain knowledge component (e.g., domain knowledge component 312 of FIG. 3) extracts domain terms from the unstructured data. The domain knowledge component includes a number of pre-defined domain-specific terms (e.g., 'CRM', 'FIN' and 'server error') that are manually defined by domain experts. When a task instance is automatically generated from a submitted task (e.g., IT ticket), domain knowledge component takes the unstructured data as input and automatically determines whether any domain term is included. If one or more domain terms are found, each domain term is added to the task instance. The task attribute domainTerm holds the value of the discovered domain terms.

To calculate task similarity, which task attributes that impact the similarity measurement are identified. Table 1, below, identifies example task attributes that can be deemed to impact the similarity measurement, and will therefore be included in the similarity calculation. Given the task attributes of Table 1, and in accordance with Equation 1, $Sim(T_a, T_b)$ is the sum of weighted similarity values of name, domainTerm, delegator, owner and collaborator, where n is equal to 5.

TABLE 1

| Task Attribute | Description |
| --- | --- |
| name | Short texts summarizing the goal of a task |
| domainTerm | Domain-specific terms representing the background of a task |
| delegator | The person (e.g., customer) who proposes the task |
| owner | The person (e.g., technician) who is responsible for task execution |
| collaborator | The other person(s) (e.g., technician(s)) involved in task execution |

By way of example, the process of task similarity computation is illustrated. Tasks in the form of IT tickets Ti-a, Ti-b and Ti-c, are wrapped in respective task instances T1, T2 and T3. Sim(T1, T2) denotes the similarity between T1 and T2, and Sim(T1, T3) denotes the similarity between T1 and T3. To protect customer privacy, sensitive contents (e.g., customer name, support technician name) are replaced with dummy data. An example of this is provided in Table 2 below.

TABLE 2

| Attributes and Values |
| --- |
| T1 {name: CompanyX-CRM error; domainTerm: CRM, server error, v1.2; delegator: c10203; owner: e89059; collaborator:; timeStamp: 21.11.2009 19:40:08} |
| T2 {name: Exception; domainTerm: CRM, exception, v1.2; delegator: c10203; owner: e16832; collaborator: e78653; timeStamp: 21.11.2009 15:28:01} |
| T3 {name: CRM error; domainTerm: CRM, server error, v1.2; delegator: c35029; owner: e73847; collaborator: e73847; timeStamp: 27.09.2009 17:27:50} |

The similarity for each attribute is calculated (e.g., $Sim_{Attk}$(T1, T2) representing the similarity between task T1 and T2 for the attribute Attk. In some implementations, attribute similarity can be calculated using the Jaccard similarity algorithm that is based on string comparison. Example string similarity, or attribute similarity, for each attribute in the above-provided example is displayed in Table 3 below.

TABLE 3

| Attribute | $Sim_{Attk}$(T1, T2) | $Sim_{Attk}$(T1, T3) |
| --- | --- | --- |
| name | 0.0 | 0.6666667 |
| domainTerm | 0.4 | 1.0 |
| delegator | 1.0 | 0.0 |
| owner | 0.0 | 0.0 |
| collaborator | 0.0 | 0.0 |

If no user-defined rule is applicable to the tasks, the value of $\gamma_k$ (e.g., from Equation 2) is equal to 0. In this case, all of the weights (i.e., $\omega_{name}$, $\omega_{domainTerm}$, $\omega_{delegator}$, $\omega_{owner}$, $\omega_{collaborator}$) are equal to ⅕. Consequently, each task attribute shares the same importance in the similarity calculation. In accordance with Equation 1, the similarity between T1 and T2 is provided as Sim(T1, T2)=$\omega_{name}$·Sim$_{name}$(T1, T2)+ . . . +$\omega_{collaborator}$·Sim$_{collaborator}$(T1, T2)=0.28, and the similarity between T1 and T3 is provided as Sim(T1, T3)=$\omega_{name}$·Sim$_{name}$(T1, T3)+ . . . + $\omega_{collaborator}$·Sim$_{collaborator}$(T1,T3)=0.33333334. When each task attribute has the same weight, the resulting similarity value is identified as the 'average weighted' task similarity. Sim(T1, T3) is greater than Sim(T1, T2), which indicates that T3 is more similar to T1 than T2 is.

In some implementations, rules (i.e., TSRs) can be defined, stored in, and retrieved from the rule repository (e.g., the rule repository 318 of FIG. 3), and the rule engine (e.g., the rule engine 322 of FIG. 3) determines that one or more rules is applicable to the similarity calculation. For example, the rule engine determines that a rule defining the absolute similarity between two tasks, such as the example TSR provided above, is applicable to Sim(T1, T2), but that no rule is applicable to Sim(T1, T3). By applying the rule to Sim(T1, T2), the value of $\gamma_{delegator}$ can be determined to be equal to 1. Consequently, $\omega_{delegator}$=(⅕+1)/(⅕+⅕+⅕+⅕+⅕+1), or ⅗. In this case, the weights for other task attributes are equal to (⅕)/(⅕+⅕+⅕+⅕+⅕+1), or ¹⁄₁₀. In this manner, the importance of the delegator task attribute is increased. Because the weights are affected by the TSR, this approach is referred to as a 'dynamic weighted' task similarity calculation. Using the values of the above-provided example, Sim(T1, T2) is equal to 0.64. In comparison to the 'average weighted' approach, discussed above, the similarity between T1 and T2 is increased after applying the rule. Because, in this example case, no rule is applicable to the calculation of Sim(T1, T3), its value is still equal to 0.33333334. The result shows that T2 is more similar to T1 than T3. A comparison between the average weighted approach and the dynamic weighted approach is provided in Table 4 below.

TABLE 4

| Task Similarity | Average Weighted | Dynamic Weighted |
|---|---|---|
| Sim(T1, T2) | 0.28 | 0.64 |
| Sim(T1, T3) | 0.33333334 | n/a |

Figure 4:
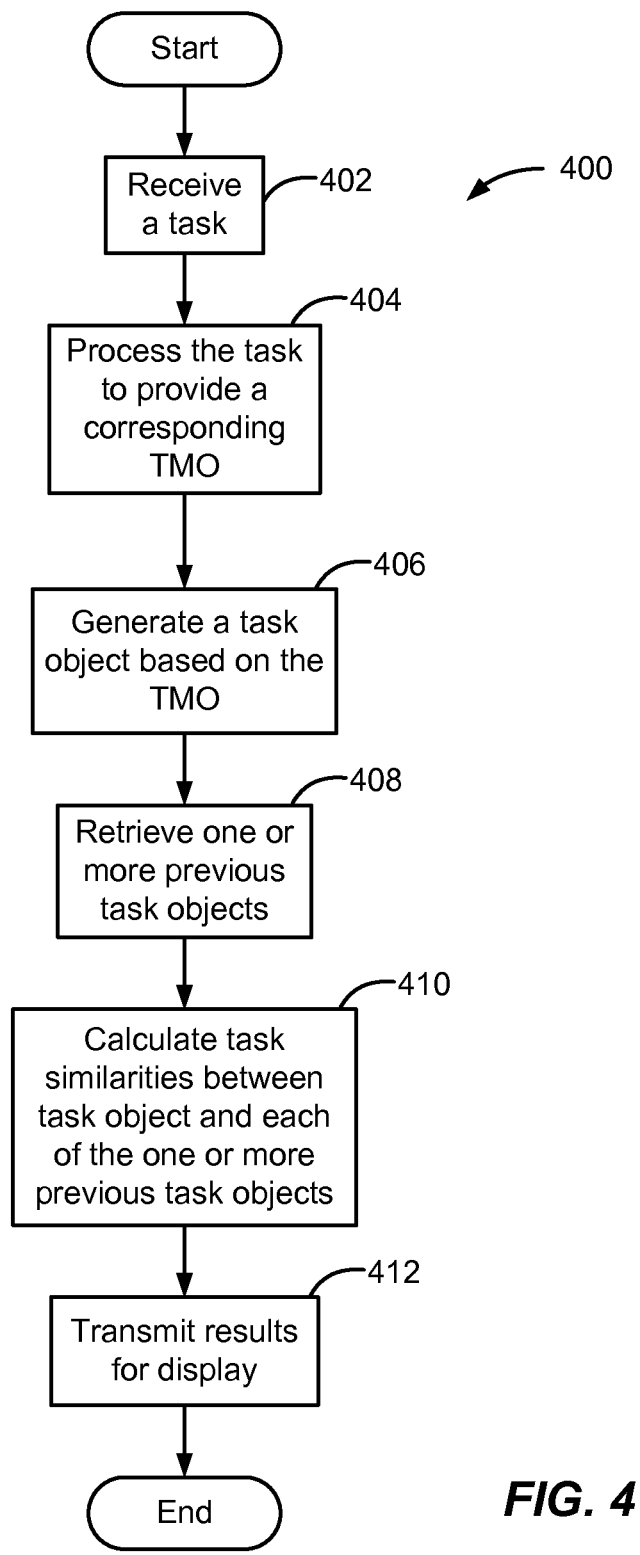
FIG. 4 is a flowchart depicting an example process for task-based experience reuse.

FIG. 4 is a flowchart depicting an example process 400 for task-based experience reuse. In the example process 400, a task is received (402). For example, a task can be submitted by a user and received at the computing device 104 and/or the server system 106 of FIG. 1. The task, as received, can be stored to memory (e.g., the task repository 302 of FIG. 3). The task is processed to provide a corresponding task TMO (404). For example, the task can be processed by the computing device 104 and/or the server system 106 of FIG. 1. As discussed above, the TMO can be constructed based on the task and provided information that can be included as metadata with the task and/or from other information resources. The TMO can be constructed in view of domain knowledge identified that can be identified using the domain knowledge component 312 of FIG. 3, for example.

A task object is generated based on the TMO (406). For example, the computing device 104 and/or the server system 106 of FIG. 1 can be implemented to generate the task object. The task object can be stored to a repository, such as the task repository 316 of FIG. 3. One or more previously stored task objects can be retrieved from computer-readable memory (408). For example, the computing device 104 can retrieve the one or more previous task objects from a locally provided computer-readable memory, and/or the memory 112 of the server system 106. In some implementations, the computing device 110 of the server system 106 can retrieve the one or more previous task objects from the memory 112.

Task similarities between the task object and each of the one or more previous task objects are calculated (410). For example, the computing device 104 and/or the server system 106 can calculate the task similarities, as described in detail above. Results of the task similarity calculations are transmitted for display (412) and the process ends. For example, the computing device 104 can provide the results of the task similarity calculations on a local display for review by a user (e.g., a technical support technician). In some implementations, the server system 106 can transmit the results of the task similarity calculations to the computing device 104 over a network for display.

In some implementations, the results can include task similarity scores for each of the one or more previous task objects. In some implementations, the results include only those previous task objects that have some degree of similarity to the task object. For example, only previous task objects associated with a task similarity calculation that is greater than some threshold value (e.g., zero) are provided in the results. In some implementations, only the top number of previous task objects are provided in the results. For example, the previous task object having the highest associated task similarity calculation (i.e., the top previous task object), the two previous task objects having the highest associated task similarity calculations (i.e., the top two previous task objects), or the three previous task objects having the highest associated task similarity calculations (i.e., the top three previous task objects).

In some implementations, the results can also include a description of a resolution of the task object. For example, the results can identify a process or processes that were executed to resolve a previous task object identified as being similar to the current task object, as well as the collaborators, documents, owner, and/or delegator of the previous task object. In this manner, the user (e.g., technical support technician) can be provided with explicit insight in resolving the task object at hand, in view of the manner in which previous task objects that are deemed to be similar were resolved.

Figure 5:
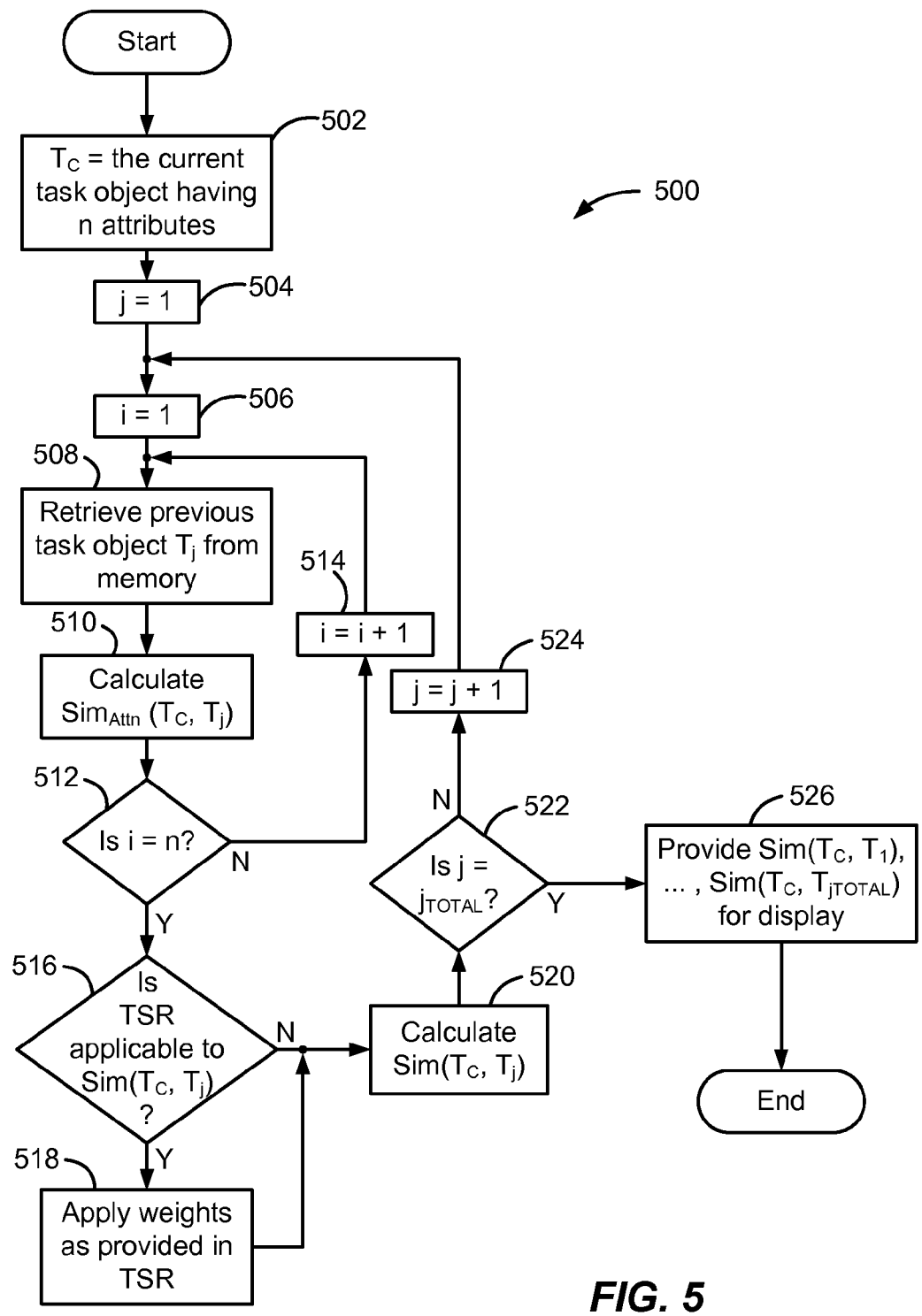
FIG. 5 is a flowchart depicting an example process for calculating task similarities

FIG. 5 is a flowchart depicting an example process 500 for calculating task similarities. In the process 500, $T_C$ is designated (502) as the current task object having n attributes, and for which task similarities are to be determined. For example, the computing device 104 and/or the server system 106 can designate $T_C$ as the current task object. The process 500 sets a counter j equal to 1 (504) and a counter i equal to 1 (506). For example, the computing device 104 and/or the server system 106 can set the respective counters equal to 1. A previous task object $T_j$ is retrieved from memory (508). For example, the computing device 104 and/or the server system 106 can retrieve $T_j$ from the computer-readable and -writable memory 112 of FIG. 1).

The task attribute similarity, Sim$_{Atti}$($T_C$, $T_j$), is calculated (510). For example, the computing device 104 and/or the server system 106 can calculate Sim$_{Atti}$($T_C$, $T_j$). The process 500 determines whether i is equal to n (512), where n is the total number of attributes to be compared between the task objects. For example, the computing device 104 and/or the server system 106 determines whether i is equal to n. If i is not equal to n, i is incremented (514) and the process 500 continues at 508. For example, the computing device 104 and/or the server system 106 can increment i. If i is equal to n, the process 500 determines whether a TSR is applicable to the task similarity calculation, $Sim(T_C, T_j)$ (516). For example, the computing device 104 and/or the server system 106 can determine whether a TSR is applicable based on the compared task attributes, as discussed above. If a TSR is applicable to the overall task similarity calculation, $Sim(T_C, T_a)$, weights are applied as provided in the TSR. For example, the computing device 104 and/or the server system 106 can apply a corresponding weight to each of the task attribute similarity values.

The overall task similarity calculation, $Sim(T_C, T_j)$, is calculated (520). For example, the computing device 104 and/or the server system 106 can calculate $Sim(T_C, T_j)$ based on summing the individual task attribute similarity values, $Sim_{Attr}(T_C, T_j)$, with dynamic weights applied (i.e., dynamic weighting), or with average weights applied (i.e., average weighting), as discussed above. The process 500 determines whether the counter j is equal to $j_{TOTAL}$ (522), which is the total number of previous task objects that are to be compared to T. For example, the computing device 104 and/or the server system 106 can determine whether the counter j is equal to $j_{TOTAL}$. If the counter j is not equal to $j_{TOTAL}$, the values of one or more of $Sim(T_C, T_1)$, $Sim(T_C, T_{jTOTAL})$ are provided for display (526) and the process 500 ends. For example, the computing device 104 and/or the server system 106 provide one or more of $Sim(T_C, T_1)$, $Sim(T_C, T_{jTOTAL})$ for display.

Figure 6:
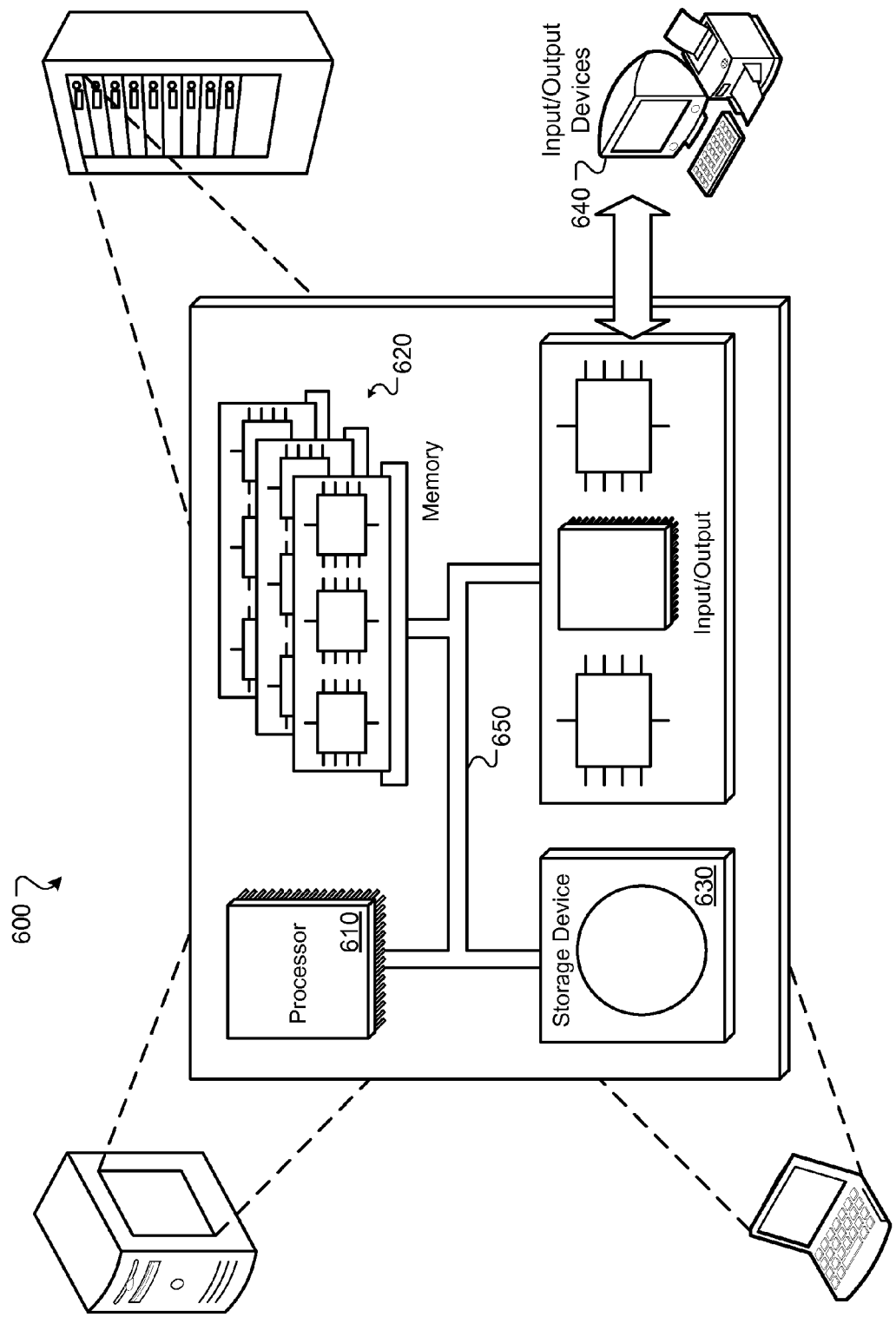
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of determining a similarity between tasks, the method comprising:
   receiving a task, at a computing device, the task comprising structured data and unstructured data;
   processing the task to generate a current task object based on the structured data and the unstructured data, the current task object comprising a plurality of task attributes;
   retrieving a previous task object from a computer-readable repository;
   for each task attribute of the plurality of task attributes, calculating a task attribute similarity value based on a corresponding task attribute of the previous task object, thereby providing a plurality of task attribute similarity values;
   providing a user defined rule based on human knowledge, the rule comprising a plurality of conditions, each condition representing a task context that comprises one or more task attributes associated with one or more respective predefined values and that indicates an influence of the task attributes on task attribute similarity values; and
   determining that the rule is applicable to a task similarity calculation based on one or more of the plurality of conditions and in response:
      dynamically determining a plurality of weight values such that a weight value is determined for each task attribute and each weight is determined using the number of task attributes and a task attribute similarity value based on the rule processing;
      weighting each of the plurality of task attribute similarity values using the plurality of weight values to provide a plurality of weighted task attribute similarity values, wherein a first weight value applied to a first task similarity value is different than a second weight value applied to a second task similarity calculation in response to determining that the rule is applicable to the task similarity calculation;
      calculating a task similarity value between the current task object and the previous task object based on the weighted task attribute values; and
   providing the task similarity value to be displayed on a display.

2. The method of claim 1, wherein determining whether the rule is applicable to a task similarity calculation comprises:
   retrieving the rule from a rule repository; and
   determining whether the rule is applicable to the task similarity calculation based on one or more of the plurality of task attributes of the current task object.

3. The method of claim 2, wherein determining whether the rule is applicable to the task similarity calculation is further based on one or more task attributes of the previous task objects.

4. The method of claim 1, wherein each of the weight values is determined based on a number of task attributes in the plurality of task attributes and a parameter.

5. The method of claim 4, wherein the parameter varies between two or more of the weight values when determining that the rule is applicable to the task similarity calculation.

6. The method of claim 4, wherein the rule defines a value of the parameter for each of the weight values.

7. The method of claim 1, wherein the rule comprises compulsory context information (CCI) and optional context information (OCI), and each of the weight values is determined based on a total number of previous task objects that meet the CCI and task-ranking values based on the OCI.

8. The method of claim 1, wherein application of the rule results in the task similarity value indicating an absolute similarity between the current task object and the previous task object.

9. The method of claim 8, wherein the task similarity value is equal to one.

10. The method of claim 1, wherein application of the rule results in the task similarity value indicating an absolute dissimilarity between the current task object and the previous task object.

11. The method of claim 10, wherein the task similarity value is equal to zero.

12. The method of claim 1, wherein processing the task to generate a current task object comprises:
    mapping each data of the structured data to a corresponding task attribute;
    extracting one or more terms from the unstructured data; and
    mapping each of the one or more terms to a corresponding task attribute.

13. The method of claim 12, wherein extracting one or more terms from the unstructured data comprises comparing terms of the unstructured data to pre-defined terms that are stored in computer-readable memory, wherein a term is extracted when the term matches a pre-defined term.

14. The method of claim 13, wherein the pre-defined terms are domain-specific terms that are manually entered into the computer-readable memory.

15. The method of claim 1, further comprising:
    calculating a plurality of task similarity values between the current task object and each of a plurality of previous task objects, the task similarity value being included in the plurality of task similarity values; and
    providing one or more of the plurality of task similarity to be displayed on the display.

16. The method of claim 1, further comprising:
    identifying information corresponding to a resolution of the previous task; and
    providing the information to be displayed on the display.

17. The method of claim 1, wherein the first weight value applied to the first task similarity value is equal to the second weight value applied to the second task similarity value when determining that the rule is inapplicable to the task similarity calculation.

18. A non-transitory computer-readable storage medium coupled to one or more processors and having instructions stored thereon which, when executed by the one or more processors, cause the one or more processors to perform operations, the operations comprising:
    receiving a task, the task comprising structured data and unstructured data;
    processing the task to generate a current task object based on the structured data and the unstructured data, the current task object comprising a plurality of task attributes;
    retrieving a previous task object from a computer-readable repository;
    for each task attribute of the plurality of task attributes, calculating a task attribute similarity value based on a corresponding task attribute of the previous task object, thereby providing a plurality of task attribute similarity values;

providing a user defined rule based on human knowledge, the rule comprising a plurality of conditions, each condition representing a task context that comprises one or more task attributes associated with one or more respective predefined values and that indicates an influence of the task attributes on task attribute similarity values; and determining that the rule is applicable to a task similarity calculation based on one or more of the plurality of conditions, and in response:

dynamically determining a plurality of weight values such that a weight value is determined for each task attribute and each weight is determined using the number of task attributes and a task attribute similarity value based on the rule processing;

weighting each of the plurality of task attribute similarity values using the plurality of weight values to provide a plurality of weighted task attribute similarity values, wherein a first weight value applied to a first task similarity value is different than a second weight value applied to a second task similarity calculation in response to determining that the rule is applicable to the task similarity calculation;

calculating a task similarity value between the current task object and the previous task object based on the weighted task attribute values; and providing the task similarity value to be displayed on a display.

19. A system, comprising:

a display;

one or more processors; and a computer-readable storage medium coupled to the one or more processors and having instructions stored thereon which, when executed by the one or more processors, cause the one or more processors to perform operations, the operations comprising:

receiving a task, the task comprising structured data and unstructured data; processing the task to generate a current task object based on the structured data and the unstructured data, the current task object comprising a plurality of task attributes;

retrieving a previous task object from a computer-readable repository;

for each task attribute of the plurality of task attributes, calculating a task attribute similarity value based on a corresponding task attribute of the previous task object, thereby providing a plurality of task attribute similarity values;

providing a user defined rule based on human knowledge, the rule comprising a plurality of conditions, each condition representing a task context that comprises one or more task attributes associated with one or more respective predefined values and that indicates an influence of the task attributes on task attribute similarity values; and determining whether that the rule is applicable to a task similarity calculation based on whether one or more of the plurality of conditions are met, and in response:

dynamically determining a plurality of weight values such that a weight value is determined for each task attribute and each weight is determined using the number of task attributes and a task attribute similarity value based on the rule processing;

weighting each of the plurality of task attribute similarity values using the plurality of weight values to provide a plurality of weighted task attribute similarity values, wherein a first weight value applied to a first task similarity value is different than a second weight value applied to a second task similarity calculation in response to determining that the rule is applicable to the task similarity calculation;

calculating a task similarity value between the current task object and the previous task object based on the weighted task attribute values; and providing the task similarity value to be displayed on the display.

* * * * *